Oct. 16, 1962 A. M. REITER 3,059,054

AUDIO NONSENSE GENERATOR

Filed April 28, 1958

INVENTOR.
ABRAHAM M. REITER

BY Lyon & Lyon

ATTORNEYS 3,059,054
AUDIO NONSENSE GENERATOR

Abraham M. Reiter, Reseda, Los Angeles, Calif., assignor, by mesne assignments, to Paramount Pictures Corporation, New York, N.Y., a corporation of New York Filed Apr. 28, 1958, Ser. No. 731,286
1 Claim. (Cl. 179—1.5)

This invention relates to communication systems of the type where it is desired to prevent information being transmitted from being intelligibly received except by authorized receivers and, more particularly, to improvements therein.

In an application by Phil H. Weiss for a Secrecy System, Serial No. 501,840, filed April 18, 1955, which is assigned to a common assignee, there is described an audio secrecy system which is suitable, for example, for use in a subscription television system wherein it is desired to prevent nonsubscribers and those who have not paid to view the program from hearing the program. The arrangement described contemplates using two transmission channels for the program audio. The audio is transmitted on one or the other of these channels and randomly switched in the course of such transmission. At the commencement of a switching interval, the program is brought up to the same level on both channels. Then the switch occurs; then the program level on the channel on which it is not desired to continue to transmit is reduced. In this manner, transients which may occur due to switching from one channel to another if this procedure is not followed are eliminated. Unauthorized persons can use these switching transients to follow the program. At times, the channel on which program is not being transmitted carries another message which has been designated as barker, since it describes the virtues and price of the program about to be transmitted or which is being transmitted. The subscriber receivers which have not paid to view a program are enabled to follow the barker transmission as it and the audio program are cross-switched between channels.

Oftentimes, the barker is not available or during a program may not be desired. Thus, to prevent a person from listening to both channels simultaneously with a broad-band receiver, thereby unscrambling the sound without regard to switching, it is necessary to put some sort of annoying signal on the channel on which program transmission is not being made. Such an annoying, or nonsense, signal must have certain characteristics. Otherwise, it fails of its purpose. For example, it must cover the same general frequency band as the program, so that a filter or other simple circuit cannot take it out. It should be sufficiently annoying so that one cannot listen to the program and a nonsense signal simultaneously. Any crosstalk which may arise in small amounts should not be objectionable. It is possible for crosstalk to be objectionable when the program happens to be low level and the nonsense signal high level. Thus, the nonsense signal should always be at the same amplitude as the program audio signal.

An object of the present invention is to provide a suitable nonsense signal for utilization in the system described.

Another object of the present invention is to provide a nonsense signal for use in an arrangement where a program signal is randomly switched between two transmission channels which cannot be filtered or otherwise readily eliminated from the program signal when both are received simultaneously.

Yet another object of the present invention is the provision of apparatus for deriving a nonsense signal from the program audio signal itself, to thereby minimize annoyance due to any crosstalk.

Still another object of the present invention is the provision of an arrangement for generating a nonsense signal which cannot be listened to for any length of time without annoyance.

The above and other objects of this invention are achieved by generating a signal from the program audio itself in such a way that the fundamental is eliminated and 100 percent second harmonic distortion is generated. The arrangement for generating this is to modulate the program audio on a carrier, employing a balanced modulator. The output of the balanced modulator is a double sideband suppressed carrier signal. This is then rectified and passed through a low-pass filter. The output of the low-pass filter yields desired nonsense signal.

The novel features that are considered characteristic of this invention are set forth with particularity in the appended claim. The invention itself, both as to its organization and method of operation, as well as additional objects and advantages thereof, will best be understood from the following description when read in connection with the accompanying drawings, in which:

Figure 1:
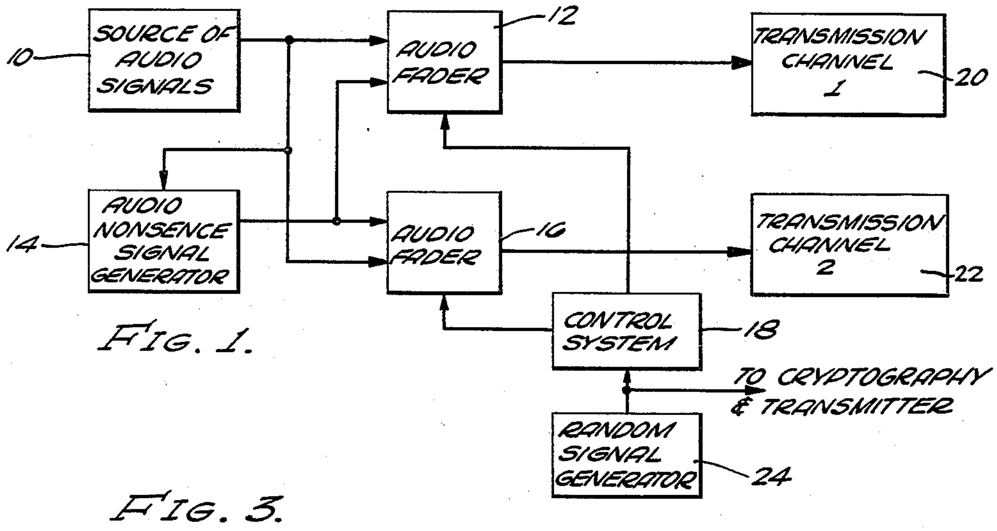
FIGURE 1 is a block diagram of an arrangement for utilizing the audio nonsense signal.

In order to illustrate the utility of the signal generated in accordance with this invention, FIGURE 1 shows a block diagram of an arrangement in accordance with the teachings of the previously mentioned application by Phil Weiss, wherein the audio nonsense signals generated in accordance with this invention may be advantageously employed. A source of audio signals 10, which can be the program audio signals of the television program, are applied to an audio fader 12, to an audio nonsense signal generator 14, and to an audio fader 16. The output of the audio nonsense signal generator is applied to the audio fader 12 and to the audio fader 16. The audio nonsense signal generator 14 is a rectangle which represents structure in accordance with this invention, which is shown in detail in FIGURE 2.

The audio faders or signal mixers 12 and 16 are well-known impedance-matching variable attenuation circuits which perform the function of mixing two signals applied to their inputs. These audio faders are well known in the broadcast radio and television field and are commercially purchasable. The audio faders 12, 16, accordingly, will have applied to their inputs two signals. The audio faders are controlled by an arrangement designated as a control system 18. Structure for this is shown and described in detail in the aforementioned Weiss application. For the purposes of the present explanation, it is sufficient to understand that the control system will drive the audio faders so that during quiescent intervals the outputs of the audio faders 12, 16, which are respectively applied to a transmission channel 20 and a second transmission channel 22, will be program audio and audio nonsense.

The control system 18 can consist of a set of actuating cams (not shown) which effectively program the direction of rotation of two motors (not shown), one of which is assigned to drive the audio fader 12 and the other the audio fader 16. The cams (not shown), in turn, may be driven by a randomly actuated motor (not shown), the operation of which is initiated by a random-signal generator 24. The output of the random-signal generator not only initiates operation of the control system 18, but is applied to subsequent cryptography circuits, and thereafter transmitted. The purpose of this is to inform the receivers of subscribers when the switching operation is to occur. In view of the cryptography, the signal is not available to unauthorized receivers. When a switching operation is indicated, the control system 18 will drive the one of the faders, the output of which is audio nonsense, in a direction to reduce the audio nonsense level to zero and to bring up the audio program to the same level as it appears at the output of the other audio fader. Thereafter, dependent upon the camming arrangement, one of the two audio faders will be operated to reduce the amplitude of the program audio and increase the amplitude of the audio nonsense.

A receiver will receive the output of both transmission channels and will have a switching device which can be actuated by a suitable decording system to select whichever one of the two channels the audio program is being transmitted over. The output of the switching device is applied to the audio reproducing system of the receiver.

The above description of FIGURE 1, as previously pointed out, is a general one and made for the purpose of indicating the utility of the audio nonsense signal for properly preserving secrecy in a system of the type described. For further details of the system described in FIGURE 1, reference is made to the previously mentioned Weiss application.

It should be apparent that without the presence of an audio nonsense signal or any other irritating signal, the system shown in FIGURE 1 cannot cover or reserve secretly the audio program signals where the receiver has a sufficient bandwidth to receive simultaneously signals being transmitted over channels 1 and 2. Just any signal is not suitable, since if it is possible to filter it out from the received outputs of the two transmission channels, or if it is possible to listen to the audio despite the presence of the other signal, the secrecy system fails in its purpose. To generate a spoiling, or nonsense, signal that is sufficiently irritating to prevent a listener from enjoying the program in its presence and also which cannot be filtered out, apparatus such as is shown in FIGURE 2 is employed.

Figure 2:
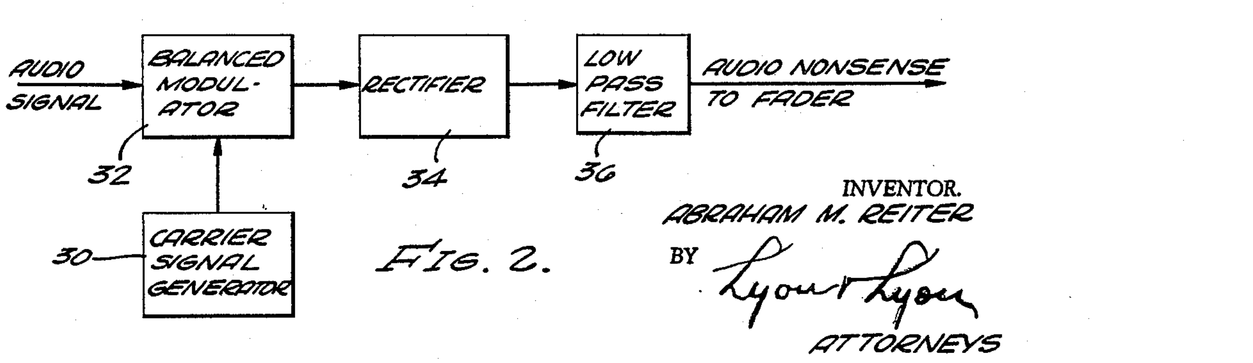
FIGURE 2 is a block diagram of an embodiment of this invention.

FIGURE 2 is a block diagram of an embodiment of the invention. A carrier-signal generator 30 is employed to generate a carrier signal at a frequency which is not important, from the standpoint of the value selected. The only limitation to be applied is that it be very high, when compared to the frequency of the audio signals. In the embodiment of the invention, a one-megacycle carrier signal is employed. The output of the carrier-signal generator 30 and the audio signals from the source 10 are applied to a balanced modulator 32. As is well known, the output of the balanced modulator will be a double sideband suppressed carrier.

Figure 3:
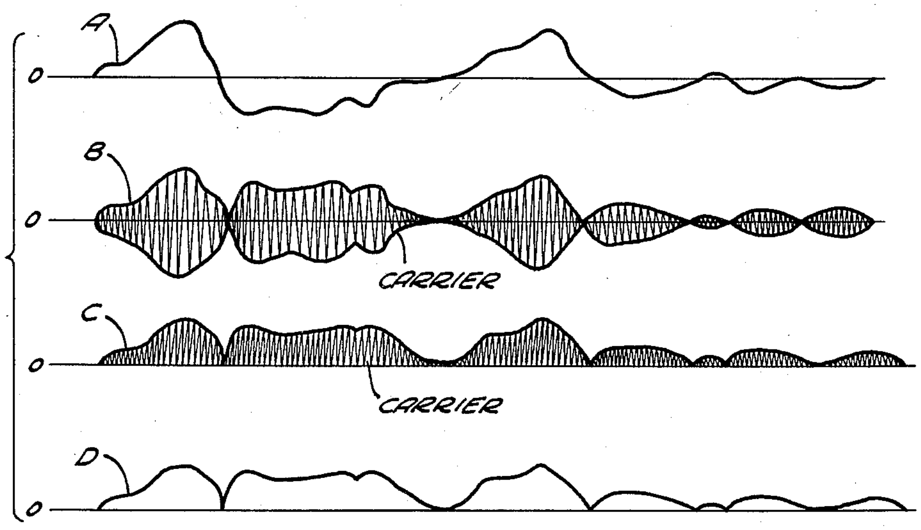
FIGURE 3 is a drawing of wave shapes, shown for the purpose of illustrating the operation of this invention.

FIGURE 3 shows the wave shapes obtained. The wave shape A is a typical wave shape of an audio input to the balanced modulator. The wave shape B shows the output which is derived which comprises the sidebands without the carrier. This waveform appears like the original audio signals, except that it is folded with respect to the zero axis, to form a mirror image. The output of the balanced modulator is applied to a rectifier 34, which removes one-half of the waveform B, leaving the waveform C in FIGURE 3. It should be noted that the envelope of the waveform C is not the same as the original audio. The ouput of the rectifier 34 is applied to a low-pass filter 36 for the purpose of removing any high frequency. The output of the low-pass filter has the appearance of the waveform D and it comprises the audio nonsense signal. It will be noted that this waveform has the same amplitude as the original audio signal and has the appearance of a wave that is obtained when the portions of the original audio signal which are below the zero axis are inverted in polarity and added to the portion of the original audio signal which is above the zero axis.

This signal is extremely annoying and cannot be listened to for any length of time. It has the same amplitude as the program at all times, so that any crosstalk into the program is always the same percentage of the program amplitude. Such crosstalk appears only as distortion of the audio and is not very noticeable. As much as 10 percent crosstalk can be tolerated. Otherwise, the extent of crosstalk tolerable is at most one percent. The requirement for the frequency pass band of the low-pass filter is that it pass the highest of the audio signals. A 0 to 20 kc. frequency band for the low-pass filter has been found to be suitable.

There has accordingly been described and shown herein a novel, useful, and unique arrangement for providing an audio nonsense signal in a system where secrecy is desired to be preserved for a program transmission which is randomly switched between two channels.

I claim:

In a system for maintaining the security of transmission of audio signals by randomly switching said audio signals between two transmission channels, the improvement comprising means for generating carrier signals which have a high frequency relative to that of said audio signals, means for modulating said audio signals on said carrier signals to obtain double sideband suppressed carrier signals, means to rectify said double sideband suppressed carrier signals, means to filter out carrier frequency signals from said rectified double sideband suppressed carrier signals to provide audio nonsense signals, and means to randomly cross-switch said audio nonsense signals with said audio signals between said two transmission channels.

References Cited in the file of this patent

UNITED STATES PATENTS

| | | |
|---|---|---|
| 2,373,569 | Kannenberg | Apr. 10, 1945 |
| 2,401,464 | Corderman | June 4, 1946 |
| 2,565,409 | Thompson | Aug. 21, 1951 |
| 2,586,475 | Milliguet | Feb. 19, 1952 |
| 2,629,000 | Olson et al. | Feb. 17, 1953 |
| 2,703,865 | Grayson et al. | Mar. 8, 1955 |
| 2,705,742 | Miller | Apr. 5, 1955 |
| 2,707,208 | Smith | Apr. 26, 1955 |
| 2,724,742 | Chesnut | Nov. 22, 1955 |
| 2,765,443 | Rothman | Oct. 2, 1956 |
| 2,810,787 | Ditoro et al. | Oct. 22, 1957 |
| 2,821,683 | Koenig | Jan. 28, 1958 |
| 2,860,186 | Hefele | Nov. 11, 1958 |